Oct. 23, 1923.

M. A. DEFIBAUGH

ELECTRIC MOTOR TERMINAL CONNECTION

Filed Aug. 24, 1921

1,471,834

Patented Oct. 23, 1923.

1,471,834

UNITED STATES PATENT OFFICE.

MARK A. DEFIBAUGH, OF BATTLE CREEK, MICHIGAN, ASSIGNOR TO H. B. SHERMAN MANUFACTURING CO., OF BATTLE CREEK, MICHIGAN, A CORPORATION OF MICHIGAN.

ELECTRIC-MOTOR TERMINAL CONNECTION.

Application filed August 24, 1921. Serial No. 495,113.

*To all whom it may concern:*

Be it known that I, MARK A. DEFIBAUGH, a citizen of the United States, residing at Battle Creek, in the county of Calhoun and State of Michigan, have invented certain new and useful Improvements in Electric-Motor Terminal Connections; and I hereby declare that the following is a full, clear, and exact description thereof, reference being had to the accompanying drawings, which form part of this specification.

This invention is an improvement in electric motors of that type in which the operative parts are encased in metal, and particularly refers to motors of the split phase induction type. The objects of the invention are to have the terminal connections arranged within the casing and adjacent an opening in the switch end bracket so as to be fully concealed, preferably by a removable plate, which may be the name plate, and yet be readily accessible from the outside when the plate is removed or swung on one side.

In motors of the split phase induction type there are two distinct windings on the stator; namely, a starting winding and a main or working winding. Four lead wires or connectors are brought out from these windings; one of these is connected to one stationary member of the centrifugal switch; the other three are usually connected to insulated binding posts on the outside of the motor frame or end bracket, or are sometimes soldered to the outside connection leads; and in such cases when it is necessary to remove the switch end bracket, it is inconvenient or difficult to disconnect the winding leads and troublesome to reconnect them on re-assembling the motor.

The particular object of the present invention is to avoid all the foregoing objections and have the leads from the lining easily accessible and protected inside the motor frame and capable of being readily disconnected or interchanged when desired.

In carrying out the invention the switch insulating base or plate is utilized to support the necessary terminal connections, the terminals being arranged inside the switch end bracket and in line with an opening in the bracket so as to be easily accessible from the outside: the cover for the opening in the switch end bracket is preferably also the name plate; which is customarily attached to the frame, and which in this invention can be conveniently adapted for use as a cover for the opening in the end bracket. The parts are so constructed that when the name plate is in position the terminal connections are all protected and hidden from view without requiring any unsightly projection, or any boxing on the exterior face of the end bracket.

I will explain the invention with reference to the accompanying drawings which illustrate one practical embodiment thereof as applied to a split phase induction electric motor; only so much of the motor being shown as will suffice to enable others skilled in the art to adopt and use the invention and summarize in the claims the essentials and novel features of the invention for which protection is desired.

Figure 1:
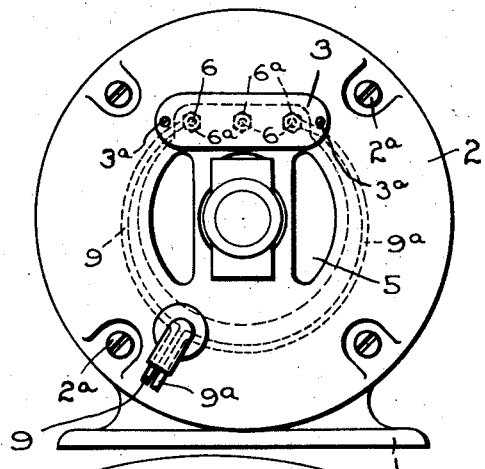
Fig. 1 is an end view of a motor with the name plate or cover in position.

The motor casing may be of any suitable construction and has a cylindric body portion 1 closed at its ends by the usual end brackets or plates 2 which are provided with bearings for the armature shaft as usual and may be detachably attached to the body 1 by bolts or screws 2$^a$ in the usual manner. In the bracket 2 at the end of the motor adjacent the switch, is an opening 2$^b$, preferably located above the shaft, and this opening can be closed by a cover 3 which may be detachably or movably fastened thereto by screws 3$^a$ or in any other suitable manner. This cover 3 is preferably utilized also as the name plate of the machine and may bear the name of the maker and if desired any other inscription or data which the maker may wish to have appear upon the motor.

The motor may be provided with a suitable automatic switch, part of which is indicated at 4; this switch is preferably a centrifugal switch, but may be of any desired construction and forms no particular part of the present invention. The part 4 of the switch is attached to and rotates with the armature as usual, and the other switch member 4ª may be attached to an insulating base plate 5 which is attached, as usual, to the inner face of the end bracket 2. This insulating plate 5 is preferably so formed that a part thereof projects above or opposite the opening 2ᵇ in the end bracket 2 and supports the binding posts or terminal screw 6, three of which are shown, which are connected in the usual manner to the leads or conductors as indicated in the drawings; the posts 6 are connected by leads 7 in the usual manner to the stator windings 8 and the two outermost posts 6 are connected to conductors 9 and 9ª leading to the outside supply circuit.

Figure 2:
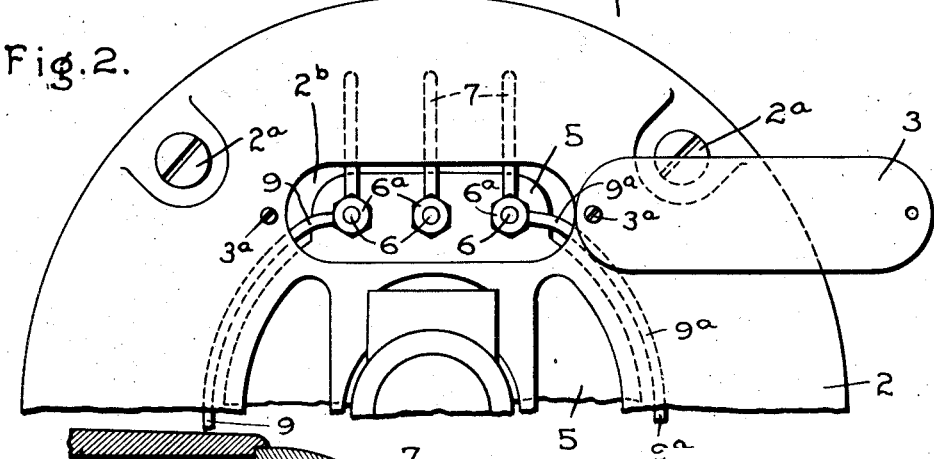
Fig. 2 is an enlarged end view of part of the motor showing the name plate removed and indicating the same plate swung back so as to uncover the terminal connections.
Figure 3:
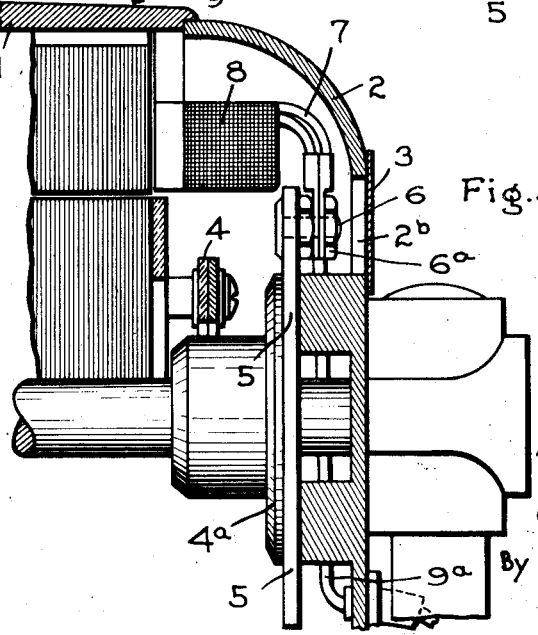
Fig. 3 is a longitudinal sectional view showing the relation of the parts.

In this construction the terminal screws 6 are supported directly behind and in line with the opening 2ᵇ in the end bracket 2 and when the cover plate 3 is removed or turned to one side as indicated in Fig. 2 the terminal screws 6 can be easily reached; and by removing the binding nuts 6ª thereon the leads may be readily disconnected, and then the end bracket 2 and parts connected therewith can be readily removed from the casing free from any attachment to the motor windings. In this invention the insulating base plate 5 is utilized as the support for all the necessary terminal connections; the terminal connections are positioned on the base plate within the switch end bracket and in line with the opening in said end bracket, so that when said opening in the bracket is uncovered the terminals are easily accessible from the outside and the connections can be changed as desired without having to pull the connections outside of the motor frame in order to make the change; and I utilize the cover for the opening in the end bracket as the name plate for the motor or to display any other data.

In this invention the parts are very compactly arranged; the symmetrical appearance of the motor is enhanced; there are no unsightly projections on the end plates of the motor for the accommodation of the terminals; and all the parts are compact and protected from accidental injury or displacement by contact with exterior objects.

While this invention is especially suitable for split phase induction motors, it may be used on any type of motor where it is desirable to fully protect or enclose the terminals and yet have them accessible from the outside of the frame without the use of outside enclosures and special terminal covers.

What I claim is:

1. In an electric motor a casing having a detachable end bracket provided with an opening; a member inside of and attached to the bracket, and terminal connections supported on said member opposite said opening, and a removable cover for said opening, substantially as described.

2. In an electric motor; a casing, a detachable end bracket provided with an opening, a member inside of and attached to said bracket; terminals supported on said member opposite the opening, leads connecting the terminals with the motor windings; and leads connecting the terminals with the electrical circuit, substantially as described.

3. In an electric motor a casing, a detachable end bracket provided with an opening, an insulating switch base plate having an extension projecting opposite the opening, terminal connections supported on said extension opposite said opening, and a cover for said opening.

4. In an electric motor; a casing, a detachable end bracket at one end of the casing; said bracket having an opening, an insulating switch base plate at the inner side of said bracket and having an extension projecting opposite the opening, a plurality of terminal connections supported on said member opposite the opening, leads connecting the terminals with the motor windings; leads connecting the terminals with the electrical circuit; and a detachable cover for said opening.

In testimony that I claim the foregoing as my own, I affix my signature.

MARK A. DEFIBAUGH.